Figure 1:
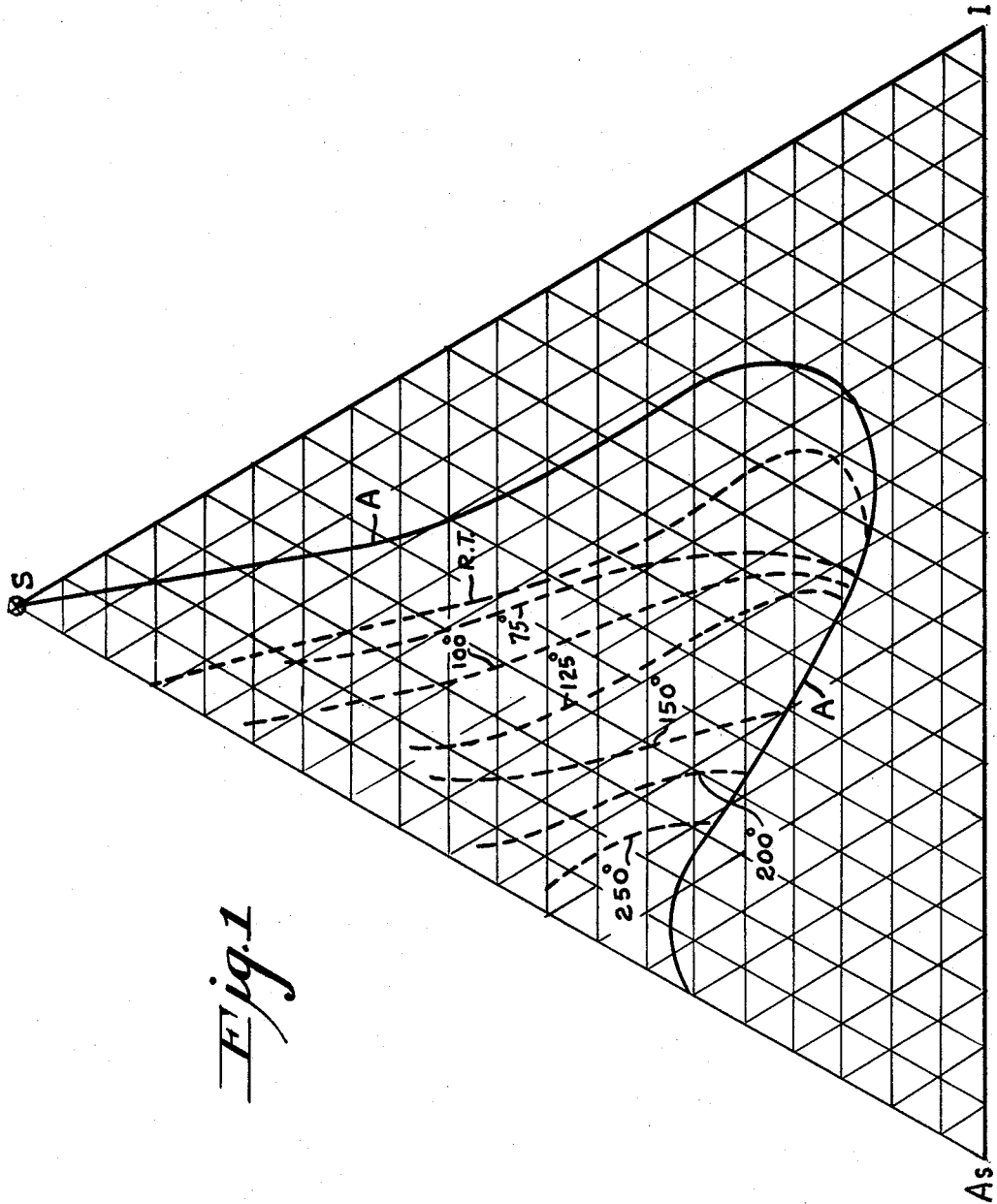

April 6, 1965

T. C. MacAVOY 3,177,082

ARSENIC SULFIDE GLASSES

Filed April 22, 1960

3 Sheets-Sheet 2

INVENTOR.
THOMAS C. MACAVOY
BY
Clarence R. Patty Jr.
ATTORNEY

United States Patent Office
3,177,082
Patented Apr. 6, 1965

3,177,082
ARSENIC SULFIDE GLASSES
Thomas C. MacAvoy, Corning, N.Y., assignor to Corning Glass Works, Corning, N.Y., a corporation of New York
Filed Apr. 22, 1960, Ser. No. 24,103
4 Claims. (Cl. 106—47)

This invention relates to low melting temperature glasses of the arsenic sulfide type. It is particularly concerned with a method of modifying certain physical properties of such glasses by means of additives, and with the resulting glasses.

There is a well-recognized need for glasses that melt or fuse at relatively low temperatures. Such glasses are needed as encapsulants for electronic components, as sealing materials, as bases for enamels and glazes, and for a variety of other specialized applications requiring a low melting, impermeable, inert material. A primary purpose of the present invention is to provide improved glasses to meet this need.

Encapsulating materials, in particular, may have special requirements that are difficult to provide. Certain types of thermally sensitive semi-conductor diodes, for example, require an encapsulant that is sufficiently fluid for application, as by coating or dipping, at a temperature not over 350° C. At the same time, the encapsulated unit should become sufficiently rigid for service at temperatures as high as 150–250° C. This requires a material having a rapidly changing viscosity in this temperature range. This property is commonly referred to in the glass art as a very high viscosity gradient or steep viscosity curve.

The material should also be chemically durable, have a high electrical resistivity and provide other superior electrical characteristics. Organic polymers possess some of these properties, but are generally unsuitable because of relatively high vapor permeability and relatively low service temperatures. A primary purpose of the present invention is to provide new glasses that are especially adapted to use as encapsulants.

Attempts have been made to lower the softening point and steepen the viscosity curve of conventional silicate, borate, and phosphate glasses with additives. These have invariably resulted in glasses that are too hygroscopic or too water soluble to be satisfactory. Arsenic sulfide glasses have recently been proposed. Such glasses have proven very useful in many respects. However, their softening points have not been as low as desired, nor have their viscosity curves been of the steepness required, for low temperature encapsulation purposes. It is a specific purpose of the invention to provide a method of modifying such glasses that corrects the indicated deficiencies.

It has been proposed to modify arsenic sulfide glasses by elemental additives such as Se, Tl, and Te. For the most part such additives have been directed at modification of infra-red transmitting properties of the glass, although thallium is particularly effective also in lowering the softening point of the glass. However, thallium is extremely toxic and difficult to handle in glass production. A more specific purpose of the invention is to provide arsenic sulfide glass additives that are simple and convenient to employ while being effective for other purposes of the invention.

I have discovered that halogens and metal halides are miscible with arsenic and sulfur in varying degrees to produce homogeneous glasses characterized by lower softening points and steeper viscosity curves than the parent glass. Iodine is by far the most miscible of the halogens with miscibility decreasing in order from iodine to bromine to chlorine to fluorine. I have also discovered that, of the various miscible metal halides, stannic iodide is by far the most miscible and most effective for present purposes.

Based on these discoveries, my invention resides in a method of lowering the softening point and steepening the viscosity curve of an arsenic sulfide glass which comprises incorporating into such glass a compatible amount of an additive selected from the group consisting of elemental halogens and metallic halides. It further resides in modified arsenic sulfide type glasses produced by such method, the preferred additives being elemental iodine or stannic iodide. The term "arsenic sulfide glass," means a glass composed basically of arsenic and sulfur except as additives are indicated. Limited substitutions of antimony for arsenic and/or selenium for sulfur can be made without changing the basic nature of arsenic sulfide glasses for present purposes.

The invention is further described with reference to, and in conjunction with, the accompanying drawings in which, FIG. 1 is a ternary or triaxial diagram illustrating and defining a preferred embodiment of the invention, As—S—I glass compositions.

Figure 2:
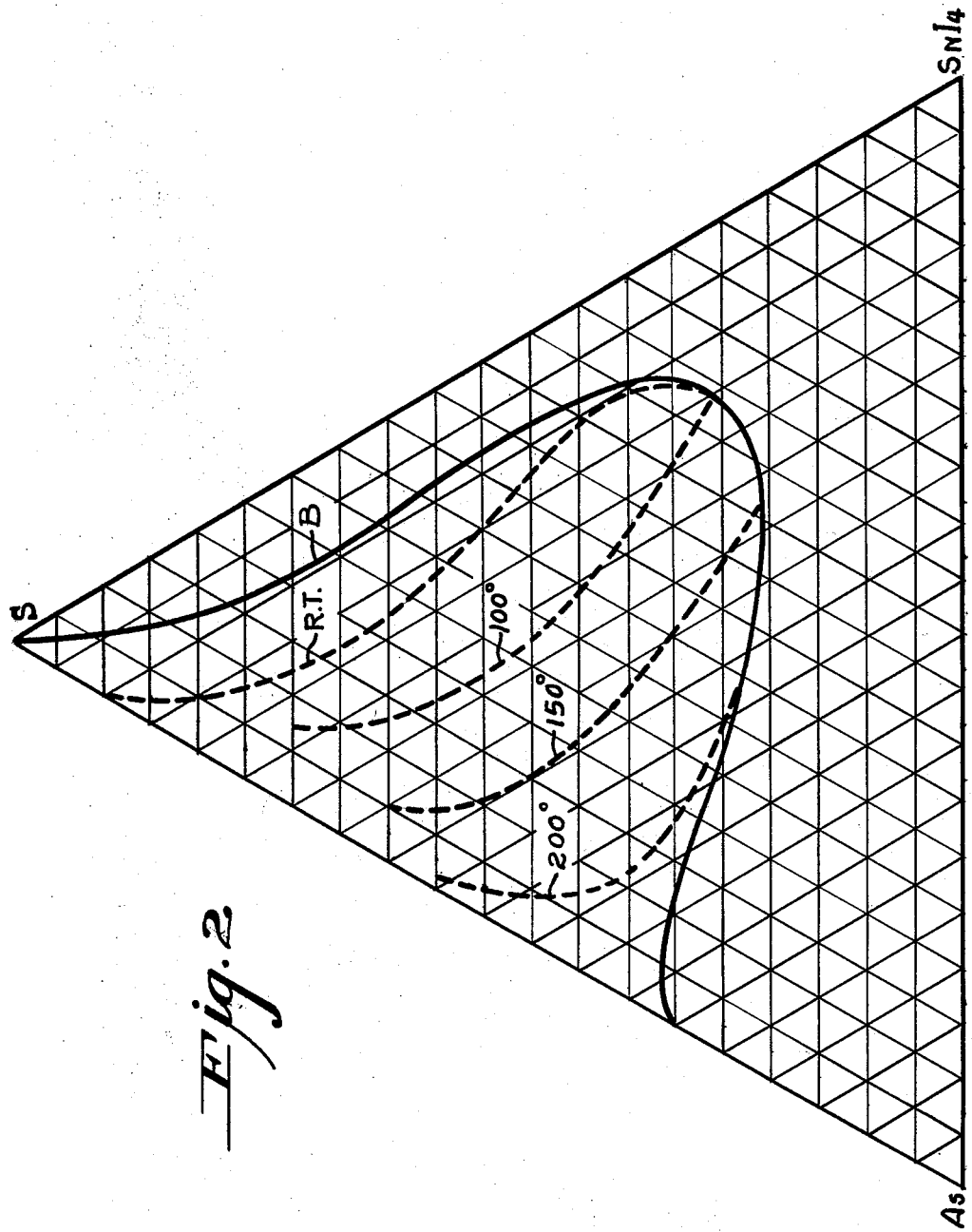
Figure 3:
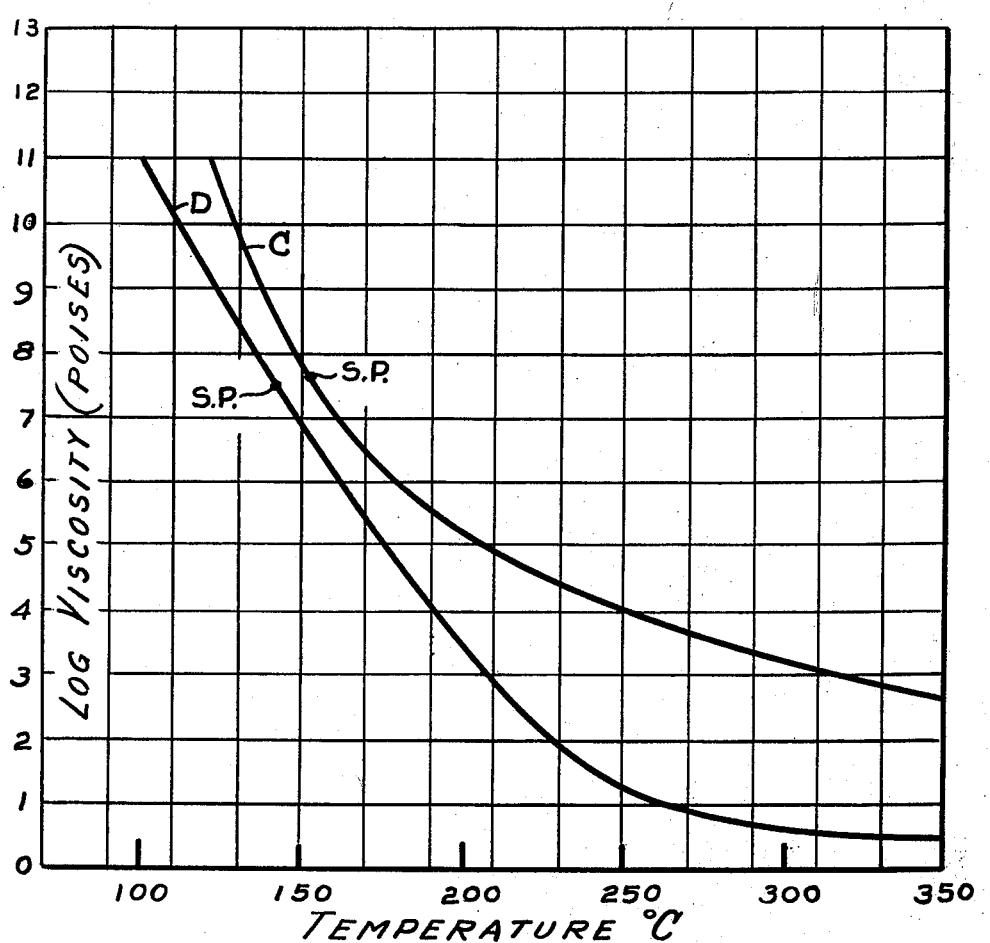

FIG. 2 is a ternary diagram illustrating and defining another embodiment of the invention, As—S—$SnI_4$ glasses and, FIG. 3 is a graphical illustration of glass property changes characterizing the invention.

In the ternary diagram of FIG. 1, the apices represent 100% of the indicated elemental component. Any selected point within the axes of the diagram defines, in percent by weight, a mixture of the three elements, arsenic, sulfur and iodine. The curved line A terminates at 2 points on the As—S axis, as indicated. It defines, with that axis, a composition area within which the three indicated component elements are miscible to form glasses. Each of the substantially vertical dotted lines indicates a series of glass compositions having a common flow temperature, as indicated in ° C. by the numeral associated with the line. This is a temperature that corresponds approximately to a value of 5 for the log viscosity, in poises, of the glasses.

It will be observed that glasses form over an extensive area in the As—S—I system, and that it is possible to incorporate in excess of 50% iodine in a properly selected arsenic sulfide base glass. As iodine is added to an arsenic sulfide base glass, the resulting glasses generally become softer and ultimately are "plastic" at room temperature. Compositions intermediate the thermal line designated R.T. and line A of this nature and are subject to flow under stress at room temperature. These compositions become rigid glasses when cooled below room temperature, as in a Dry Ice-acetone bath. As—S—I glasses are of a red-amber color, very clear and transparent, and are generally stable against devitrification even upon standing for long periods of time in a plastic condition.

In melting these glasses, the three components, As, S, and I, are mixed in elemental form, preferably in a state of high purity. The mixture is gradually heated to produce a homogeneous molten mass. Care should be taken either to provide a non-oxidizing atmosphere, such as argon or nitrogen, or to heat the mixture in a closed or small necked container. This minimizes contact with oxygen which readily reacts with the heated material and/or vapors votalized therefrom. As the temperature of the mixture reaches about 100° C., the sulfur melts and dissolves the iodine. This leaves the arsenic component suspended in a solution of sulfur and iodine. At a temperature somewhat above 200° C., an exothermic reaction between the sulfur-iodine solution and arsenic is initiated. Care should be taken, as by stirring the mixture constantly, to avoid local overheating and to insure homogeneity of the resulting molten mass. In general, the heat of reaction is sufficient to carry the fusion process to completion, although additional heat may be supplied if necessary. As indicated, care should be taken at all stages of the melting process, particularly in connection with stirring, to avoid contact with air or other sources of oxygen. The completely reacted molten mass may either be cooled in the reaction chamber, poured into a mold or other container for cooling, or held in a fluid state for dipping applications. Where the glass is to be applied as a coating or encapsulant, the product being treated may be dipped into the molten glass. Alternatively, the glass may be cooled, finely divided, applied to the article surface and subsequently fused thereto.

In producing glasses as described above, it has been found that there is a strong tendency for the iodine component to escape by volatilization. This iodine volatilization may be suppressed by employing, in lieu of the iodine component, a metal iodide. Monovalent iodides such as the alkali iodides, are generally miscible with arsenic and sulfur to form glasses, but have an undesirable depressant effect on electrical resistivity of the resultant glass. They also render the glass hygroscopic. Accordingly, it has been found preferable to employ polyvalent metal iodides as additives, particularly iodides of the heavy metals having an atomic weight above 100, such as mercury, bismuth, thallium, cadmium and tin. In general, substitution of a metal iodide additive for elemental iodine produces a glass having a somewhat higher softening point, although generally lower than that of the base arsenic sulfide glass. I have found, however, that stannic iodide is not only the most miscible iodide, but has an effect on glass softening point corresponding to that of iodine.

The ternary diagram of FIG. 2 generally corresponds to that of FIG. 1 with the exception that the lower right hand apex represents the component stannic iodide rather than elemental iodine. The line B, terminating on the As—S axis, defines the composition area within which the As, S, and $SnI_4$ components are miscible to form glasses. As in FIG. 1, compositions to the right of and below this line are either immiscible, i.e. non-glass forming mixtures, or devitrify upon cooling so that useful glasses are not obtained.

The elements, bromine, chlorine and fluorine cannot conveniently be incorporated in a glass batch in elemental form for obvious reasons. However, these additives may be introduced in the form of arsenic bromide, chloride or fluoride, respectively. Alternatively, they may be introduced as metal halides, e.g. silver chloride, antimony fluoride, etc. By way of further illustrating the effect of various additives, the following table sets forth a variety of different halogen and halide additives to an $As_2S_5$ base glass, the amount of additive in the final glass in percent by weight, and the effect of the additive on the softening point of the glass.

| Additive | Concentration, percent | Result |
| --- | --- | --- |
| $Br_2$ | 15 | Glass, more fluid than $As_2S_5$. |
| $SnI_4$ | 50 | Do. |
| $HgI_2$ | 10 | Glass, softer than $As_2S_5$. |
| $CdI_2$ | 20 | Do. |
| $TlI$ | 50 | Do. |
| $AgI$ | 10 | Do. |
| $AgCl$ | 10 | Do. |
| $SbF_3$ | 10 | Do. |

FIG. 3 illustrates the change effected in the viscosity gradient of an arsenic sulfide glass as iodine, the preferred additive, is incorporated in the glass. In the graphical illustration, the logarithm of glass viscosity in poises is plotted along the vertical axis as a function of glass temperature in ° C. plotted along the horizontal axis. Curve C is based on an arsenic sulfide glass corresponding approximately to the chemical formula $As_2S_5$ and containing 53% S and 47% As by weight. Curve D is based on this glass with a 10% substitution, or addition, of iodine, that is a glass containing 48% S, 42% As and 10% I. The softening point of the glass is indicated by the designation S.P. at about log viscosity of 7.6 on each curve, the softening point of the iodine containing glass being about 15° C. lower than that of the base glass. The viscosity curve of the iodine glass, that is curve D, is markedly steeper at viscosities below the viscosity that defines the glass softening point. In other words, the curve is more nearly vertical than that of the base glass shown by curve C. This is indicative of a higher viscosity gradient or rate of change with temperature in this significant region. It will be understood that reference to viscosity curves, and to viscosity gradient or curve characteristics, in this application is in terms of curves as shown in FIGURE 3, this being the familiar meaning of such terminology in the glass art.

While the invention has been described with reference to specific preferred compositions, it will be appreciated that other halogen and halide modified glasses in accordance with the invention likewise possess such properties in varying degree. Thus, the glasses are characteristically "short," or high viscosity gradient, glasses as illustrated in FIG. 3. They have generally high thermal coefficients of expansion, and high electrical resistivities which decrease with increasing amounts of additive. They have good durability in water, acids and weak bases, but are attacked by strong basic solutions, and tend to "wet" other metals and glasses.

Of particular interest for encapsulating applications, the glasses are essentially impermeable to vapors. In fact, service tests indicate that the forward and reverse electrical characteristics of semi-conductor devices, such as diodes, encapsulated in the present glasses are actually improved. This suggests that some impurity, such as moisture, has been eliminated from the surface of the encapsulated device. The exact nature of this change is not known, but its effect has been confirmed by repeated tests on semi-conductor devices. It is also of interest that the present glasses are generally clear and transparent both in the visible red and in the infra-red regions, the additive apparently not creating any appreciable effect on the infra-red transmission of the base arsenic sulfide glass.

What is claimed is:

1. A method of lowering the softening point and steepening the viscosity curve of an arsenic sulfide glass with a minimum of volatilization loss during melting which comprises incorporating a halide of a polyvalent metal having an atomic weight greater than 100 into the batch from which the glass is melted, the metal halide being incorporated in proportions capable of reacting with the remaining batch constituents to form a glass, and thereafter melting the batch to form a glass containing the metal halide.

2. A method in accordance with claim 1 wherein the halide is an iodide.

3. A method in accordance with claim 1 wherein the selected halide is stannic iodide.

4. An arsenic sulfide type glass composed essentially of arsenic, sulfur, and stannic iodide, each of these essential constituents being present in an appreciable amount encompassed within the U-shaped area on the ternary composition diagram of these three components defined by curved line B in FIGURE 2 of the drawing.

References Cited by the Examiner

UNITED STATES PATENTS

| | | | |
| --- | --- | --- | --- |
| 2,573,380 | 10/51 | Ambrose et al. | 106—47 |
| 2,836,544 | 5/58 | Nebergall | 106—47 |
| 2,883,292 | 4/59 | Jerger | 106—47 |
| 2,883,294 | 4/59 | Jerger | 106—47 |
| 2,961,350 | 11/60 | Flaschen et al. | 106—47 X |
| 2,979,382 | 4/61 | Frerichs | 106—47 |

TOBIAS E. LEVOW, *Primary Examiner.*

JOSEPH REBOLD, JOHN R. SPECK, *Examiners.*